(12) United States Patent
Sourov et al.

(10) Patent No.: US 7,831,902 B2
(45) Date of Patent: Nov. 9, 2010

(54) DISPLAYING INTERRELATED CHANGES IN A GRID

(75) Inventors: Alexander A. Sourov, Seattle, WA (US); Eric M. Zenz, Seattle, WA (US); Timothy B. Harahan, Seattle, WA (US); Ludovic R. Hauduc, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1103 days.

(21) Appl. No.: 11/444,117

(22) Filed: May 31, 2006

(65) Prior Publication Data

US 2007/0282462 A1    Dec. 6, 2007

(51) Int. Cl.
*G06F 17/00* (2006.01)
(52) U.S. Cl. ...................... 715/220; 715/229
(58) Field of Classification Search .............. 715/220, 715/229, 230, 212, 213, 215, 201; 705/6
See application file for complete search history.

(56) References Cited

U.S. PATENT DOCUMENTS

| | | | | |
|---|---|---|---|---|
| 5,532,754 A | * | 7/1996 | Young et al. | 725/47 |
| 5,589,892 A | * | 12/1996 | Knee et al. | 725/43 |
| 5,629,733 A | * | 5/1997 | Youman et al. | 725/53 |
| 5,638,522 A | * | 6/1997 | Dunsmuir et al. | 715/763 |
| 5,781,246 A | * | 7/1998 | Alten et al. | 725/40 |
| 5,809,204 A | * | 9/1998 | Young et al. | 386/83 |
| 5,822,123 A | * | 10/1998 | Davis et al. | 725/43 |
| 5,835,898 A | * | 11/1998 | Borg et al. | 705/8 |
| 6,219,818 B1 | | 4/2001 | Freivald et al. | 714/799 |
| 6,384,815 B1 | | 5/2002 | Huang | 345/179 |
| 6,681,369 B2 | | 1/2004 | Meunier et al. | 715/511 |
| 6,910,188 B2 | | 6/2005 | Keohane et al. | 715/751 |
| 2001/0000194 A1 | * | 4/2001 | Sequeira | 725/39 |
| 2002/0188597 A1 | * | 12/2002 | Kern et al. | 707/1 |
| 2003/0001891 A1 | | 1/2003 | Keohane et al. | 345/754 |
| 2003/0182660 A1 | * | 9/2003 | Ellis et al. | 725/60 |
| 2003/0191795 A1 | * | 10/2003 | Bernardin et al. | 709/105 |
| 2004/0019501 A1 | * | 1/2004 | White et al. | 705/2 |
| 2004/0080532 A1 | | 4/2004 | Cragun et al. | 345/745 |
| 2004/0205647 A1 | | 10/2004 | Smith | 715/530 |
| 2004/0261083 A1 | | 12/2004 | Alcazar et al. | 719/318 |
| 2005/0137925 A1 | * | 6/2005 | Lakritz et al. | 705/8 |
| 2005/0138540 A1 | | 6/2005 | Baltus et al. | 715/511 |
| 2006/0112388 A1 | * | 5/2006 | Taniguchi et al. | 718/100 |

OTHER PUBLICATIONS

Leck, Louise; "Tracking Change: A High Tech Solution." http://www.stc.org/copnfproceed/2000/PDFs/00095.PDF, May 21-24, 2000, pp. 1-6.

"How To Track Changes In A Microsoft Word 2000 Document," Microsoft Word 2000, "How To's" Widener University Information Technology Services. http://liberty.widener.edu/SiteData/docs/ITS_technology_Word_Track_Changes/7bf2f718c9ab1c0b60c2cle9d52edc14.pdf, pp. 1-3.

"Highlighting Text," Owl Editing. http://www.owled.com/markup.html, Feb. 28, 2006, pp. 1-3.

* cited by examiner

*Primary Examiner*—Laurie Ries
(74) *Attorney, Agent, or Firm*—Merchant & Gould P.C.

(57) ABSTRACT

Displaying interrelated changes in a grid may be provided. Grid cells in a document may be modified when either a grid cell is directly changed by a user, or when a grid cell changes due to information residing in another cell changing. The modified grid cells allow the user to perceive how certain changes to data in one grid cell can affect other grid cells.

17 Claims, 4 Drawing Sheets

DISPLAYING INTERRELATED CHANGES IN A GRID

BACKGROUND

Displaying interrelated changes in a grid is a process for identifying changes that arise in a document having a grid due to a change to a particular cell by a user. In some situations, when creating or maintaining a grid, the user may allow a cell in a grid to use information from other cells (interrelation). For example, when using a grid to create or maintain scheduling information, a user may have to change certain dates due to unforeseen circumstances, i.e., a delay in receiving materials. Such changes may effect other deadlines which rely on the established due date for receiving the materials. Accordingly, if a week delay in receiving materials occurs, other deadlines which rely on the receipt of materials may also be delayed by a week. However, the changes to interrelated cells resulting from the delay may not be readily apparent to the user. An inability to detect such changes may prevent the user from recognizing how other dates are affected by the change and may delay or prevent the user from addressing matters caused by the change in a timely manner. It is with respect to these and other considerations that the present invention has been made.

SUMMARY

Displaying interrelated changes in a grid may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

In accordance with one embodiment, a method is provided for displaying interrelated changes in a scheduling document by monitoring a scheduling document used to create a schedule. The method also determines if any changes are made to any data elements (cells) within the scheduling document. If a change to a scheduling event (i.e., an altered cell) in the scheduling document occurs, the method determines whether other scheduling events in the scheduling document have changed by determining if other cells (transitive cells) in the grid have changed due to their reliance on data within the altered cell. Once the transitive cells have been determined, the method highlights the appearance of the altered cell and the transitive cells to alert the user to changed data. The scheduling document is then displayed to a user including the highlighted cells.

According to another embodiment, a system is provided for displaying interrelated changes in a grid including memory storage, a display device for viewing the grid, and a processing unit coupled to the memory storage for user controlled monitoring of a document having a grid. The system also determines if any changes are made to any data elements within the grid. If a change to a data element occurs, the system determines if transitive data elements in the grid have changed due to their reliance on data within the altered data element. Once the transitive data elements have been determined, the system modifies the appearance of the altered data element and the transitive data elements to bring attention to these data elements. The grid is then displayed to a user including the modified data elements using the display device.

In accordance with yet another embodiment, a computer-readable medium is provided which stores a set of instructions which when executed performs a method for displaying interrelated changes in a grid by monitoring a document having a grid. The computer-readable medium also determines if any changes are made to any data elements within the grid. If a change to a data element occurs, the computer-readable medium determines if transitive data elements in the grid have changed due to their reliance on data within the altered data element. Once the transitive data elements have been determined, the computer-readable medium modifies the appearance of the altered data element and the transitive data elements to alert the user to changed data. The grid is then displayed to a user including the modified data elements.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
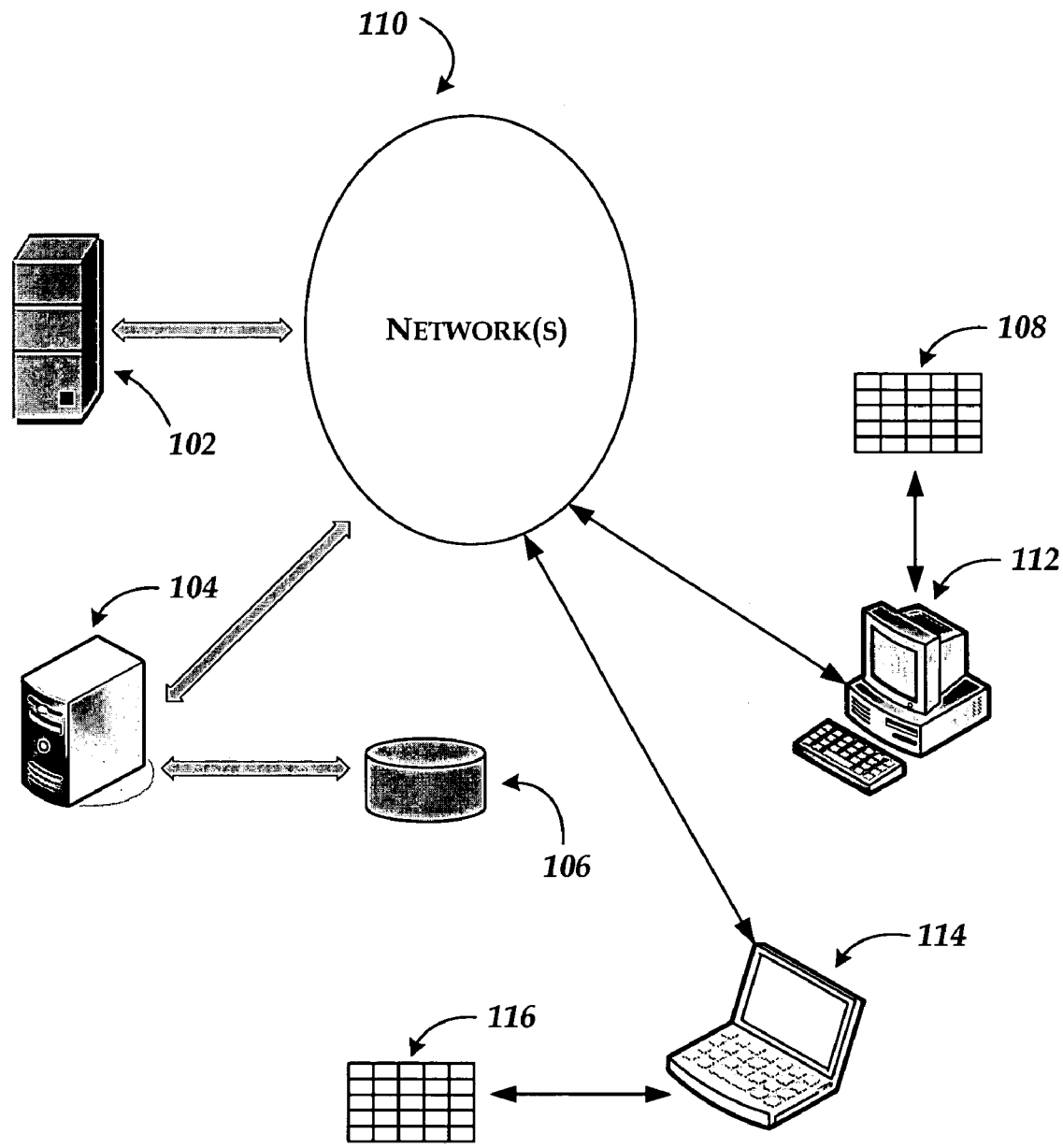
FIG. 1 illustrates a networked operating environment where embodiments may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Displaying interrelated changes in a grid may be provided. Consistent with embodiments of the present invention, a method and system for identifying and displaying data in a grid as a result of a direct change to a grid cell by a user or an indirect change to a grid cell sharing data with a grid cell that has changed is disclosed. Often when creating or editing a document having a grid, for example, a scheduling document created using software (EXCEL®, PROJECT™, etc.), a user will cause a particular grid cell to use data from another grid cell (interrelation). Accordingly, if the user changes data in a first grid cell that is used by a second grid cell, the data in the second grid cell also changes. However, the user may not realize that a change to the second grid cell has occurred because, for example, the size of the grid, or the location of the first grid cell in relation to the second grid cell. If the user does not realize that a change to a grid cell has occurred due to a change elsewhere, the user may not make adjustments to other scheduling activities to compensate for the change. Accordingly, an embodiment of the invention may provide the user with a visual indicator to bring attention to any grid cell that change due to a change caused by the user.

An embodiment consistent with the invention may include a system for displaying interrelated changes in a grid. The system may comprise a memory storage and a processing unit coupled to the memory storage. The processing unit may be operative to monitor a document having a grid that can be controlled by a user using a toggle button and determine if a first grid cell has changed. If a change to the first grid cell occurs, the processing unit is operative to change viewing characteristics of the first grid cell to a change state, i.e., highlight, bold, etc., and determine if the change to the first grid cell changes a second grid cell. If the change to the first grid cell changes a second grid cell, the processing unit is operative to change viewing characteristics of the second grid cell to the change state. The system may use a display device to display the document to the user.

Referring to FIG. 1, a networked system 100 is illustrated where example embodiments may be implemented. The networked system 100 may include a server 102, a server 104 which manages a database 106, a document 108 which may be created, edited and displayed using a desktop computer 112, and a laptop computer 114 that may be used to create, edit and display document 116. Various data types may be created and/or processed using the document 108 or the document 116 having a spreadsheet or any other type of grid (document). Examples of different data types may include scheduling information and mathematical calculations. Accordingly, a user may create, modify, and utilize the document to perform a variety of tasks.

The networked environment 100 may transmit and receive data to and from other computing devices such as the server 102, the desktop computer 112, and the laptop computer 114. Exchanged data may include any of the types described above or the like. Furthermore, networked environment 100 may transmit or receive data to a storage system 106, which is managed by server 104. Other computing devices may participate in this networked system as well, and a computing device such as the desktop computer 112 may also be used as a standalone device.

Computing devices connected to the networked environment 100 may communicate over network(s) 110. Network(s) 110 may include one or more networks. The network(s) 110 may include a secure network such as an enterprise network, or an unsecure network such as a wireless open network. By way of example, and not limitation, the network(s) may include wired media such as a wired network or direct-wired connection, and wireless media such as acoustic, RF, infrared and other wireless media.

Figure 2:
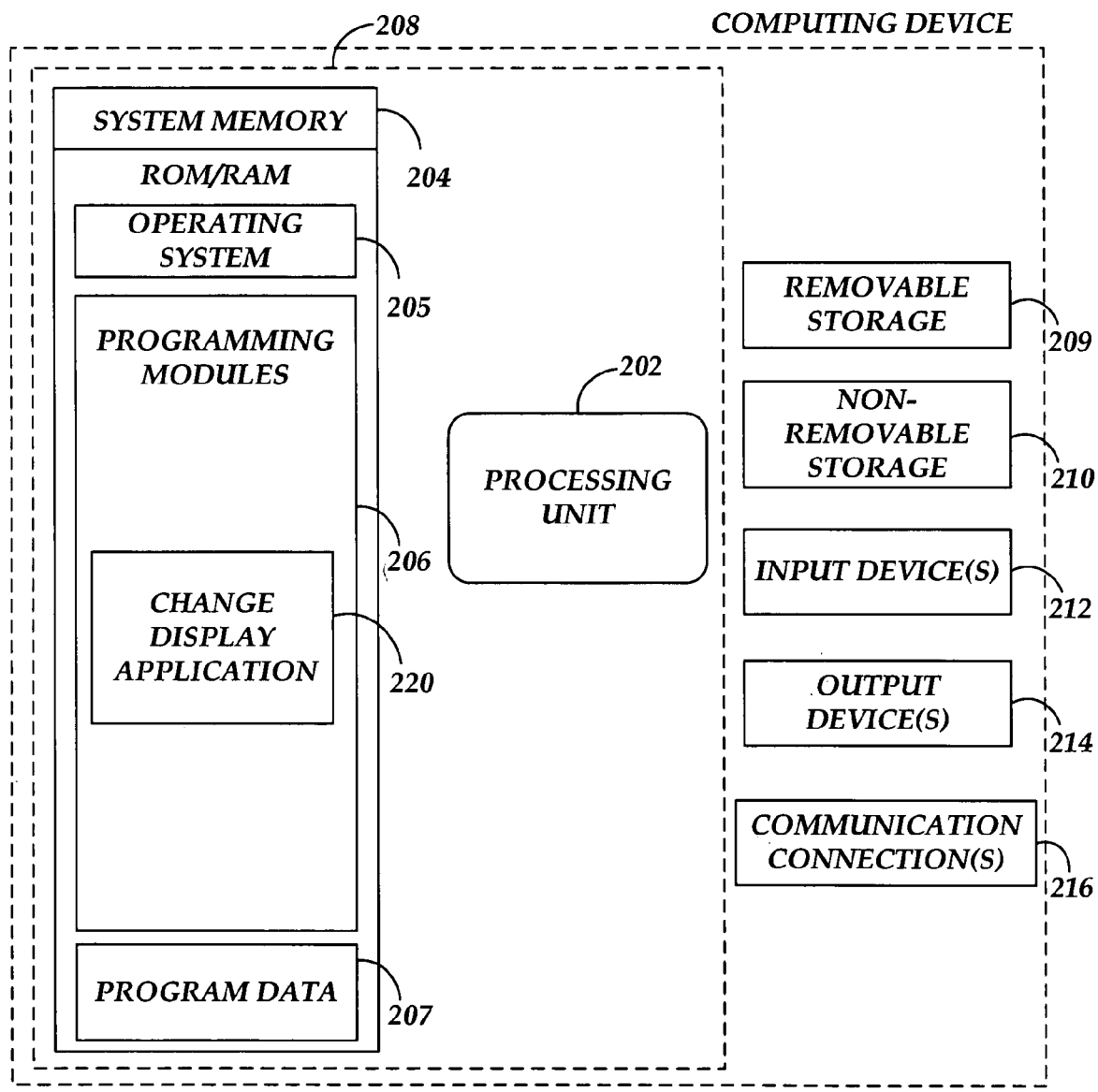
FIG. 2 is a block diagram of a system including a computing device for use in the networked operating environment of FIG. 1.

FIG. 2 is a block diagram of a system including a computing device 200, which may be used in conjunction with server 102, server 104, desktop computer 112, and laptop computer 114. Consistent with an embodiment of the invention, any suitable combination of hardware, software, or firmware may be used to implement a memory storage and processing unit. For example, the memory storage and processing unit may be implemented with computing device 200 or any of the other computing devices in combination with computing device 200. The aforementioned system, device, and processors are examples and other systems, devices, and processors may comprise the aforementioned memory storage and processing unit, consistent with embodiments of the invention. Furthermore, the computing device 200 may comprise an operating environment for an associated system. The system may operate in other environments and is not limited to computing device 200.

With reference to FIG. 2, a system consistent with an embodiment of the invention may include a computing device, such as computing device 200. In a basic configuration, computing device 200 may include at least one processing unit 202 and a system memory 204. Depending on the configuration and type of computing device, system memory 204 may comprise, but is not limited to, volatile (e.g. random access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include a document creation application for creating and editing a document. Programming modules 206 may include a change display application 220 for visually changing a grid cell view when data within the grid cell changes through direct or indirect alteration by a user. Furthermore, embodiments of the invention may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and nonvolatile, removable and non-removable media implemented in any method or technology for storage of information, such as computer readable instructions, data structures, program modules, or other data. System memory 204, removable storage 209, and non-removable storage 210 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also employ input device(s) 212 such as a keyboard, a mouse, a pen, a sound input device, a touch input device, etc. Output device(s) 214 such as a display, speakers, a printer, etc. may also be included. The aforementioned devices are examples and others may be used.

Computing device 200 may also contain a communication connection 216 that may allow device 200 to communicate with other computing devices, such as over network 110 in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 may perform processes including, for example, one or more method 300's stages as described below. The aforementioned process is an example, and processing unit 202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 3:
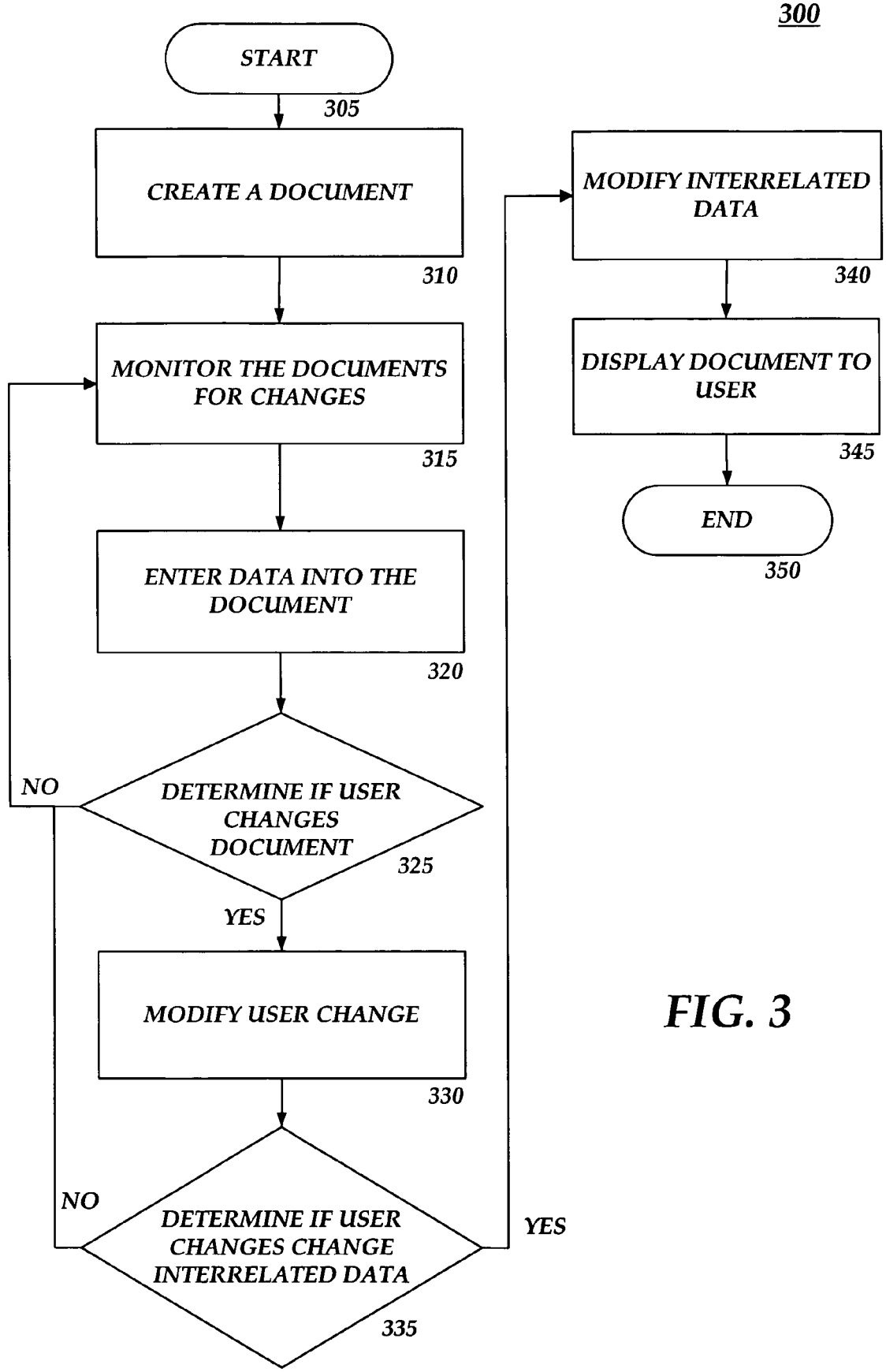
FIG. 3 is a flow chart of a method for displaying interrelated changes in a grid.

FIG. 3 is a flow chart setting forth the general stages involved in a method 300 consistent with an embodiment of the invention for displaying interrelated changes in a grid using computing device 200 of FIG. 2. Ways to implement the stages of method 300 will be described in greater detail below. Method 300 may begin at starting block 305 and proceed to stage 310 where computing device 200 may be utilized by a user to create a document, for example, a schedule. Accordingly, computing device 200 may be used to schedule tasks and other activities. Once the user creates the document, the method 300 proceeds to stage 315 where computing device 200 monitors the document for changes to the document. Next, at stage 320, the computing device 200 may allow the user to enter data into the document, i.e., additions, deletions, and edits.

Next, at stage 325, the computing device 200 may determine if any changes to the document have been entered by the user. For example, the user may edit the document by allowing a one week slip in completing a task due to a one week delay in receiving materials to complete the task. If the computing device 200 determines that no changes has occurred to the document due to the week delay, the method 300 returns to stage 315. If the computing device 200 determines that a change has occurred to the document due to the week delay, the method 300 proceeds to stage 330 where the computing device 200 modifies the appearance of the changed data, for example, highlighting, bold, underline, text color, to alert the user to the change. Such a modification by the computing device 200 may override any formatting of the data previously instituted by the user. Subsequently, at stage 335, the computing device 200 may determine whether the data change that occurred at stage 325 affects other data in the document due to data interrelation. If the computing device 200 determines that the changed data is interrelated to other data in the document, at stage 340, the computing device 200 modifies the appearance of the interrelated data as described above. If the computing device 200 determines that the changed data is not interrelated to other data in the document, the method 300 returns to stage 315.

Subsequently, at stage 345, the computing device 200 may display the document to the user including any data having a modified appearance. Accordingly, when the user makes changes directly to the document, the user may readily perceive the direct change made to the document, but may also perceive indirect changes that occur in the document due to data being interrelated to the data directly changed.

Method 300 may be used during successive changes to the document by the user. If a subsequent application of method 300 does not change data in grid cells that may have been modified during a previous implementation of method 300, the method 300 returns the previously modified grid cells to a normal state for display to the user. If the subsequent application of method 300 does change data in grid cells that may have been modified during a previous implementation of method 300, the method 300 maintains the modified state of the grid cells for display to the user.

Figure 4:
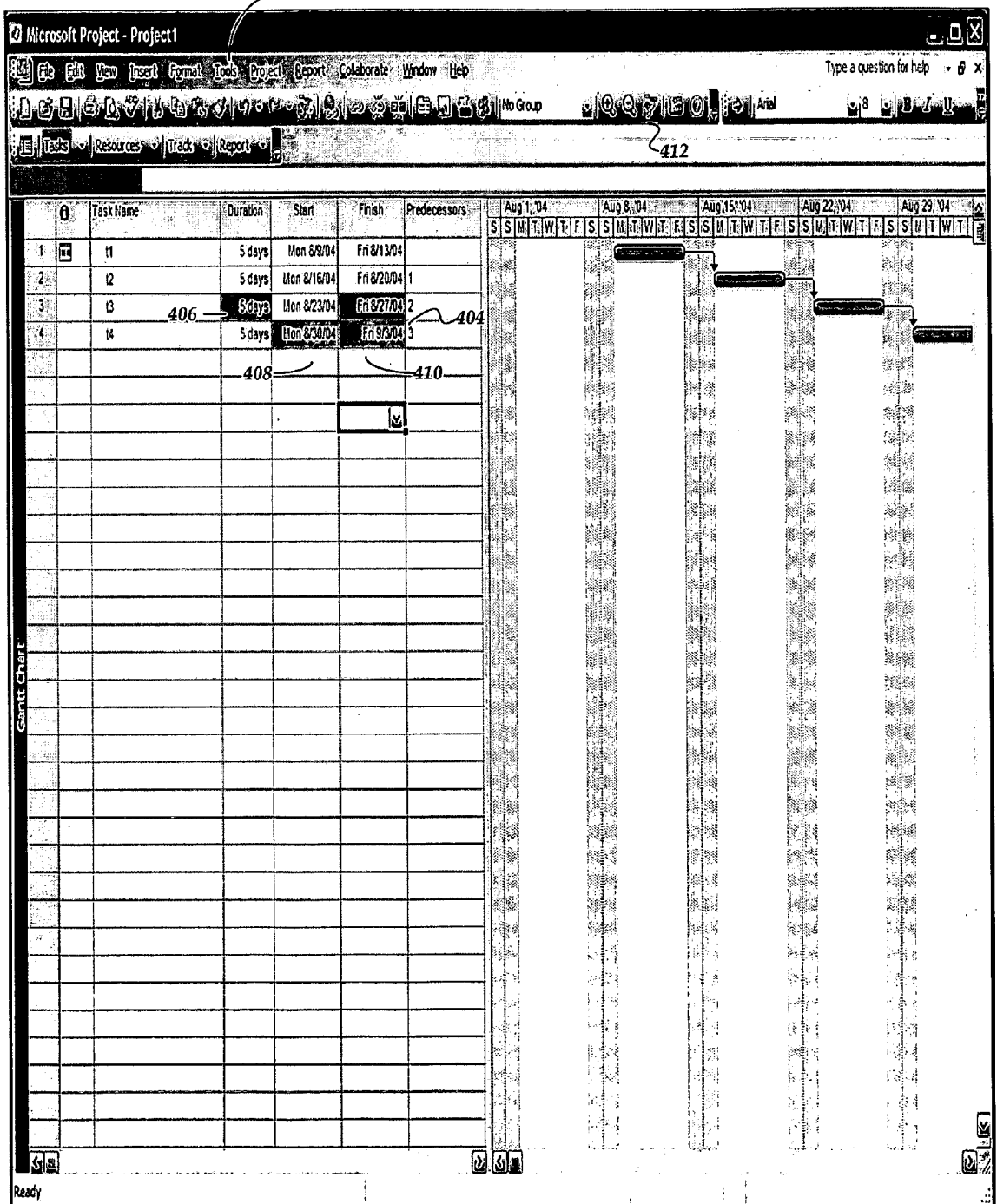
FIG. 4 is an exemplary screen shot illustrating a user interface for use with the computing device of FIG. 2.

FIG. 4 illustrates an exemplary user interface 400 for the computing device 200, according to one embodiment. Grid 401 may display grid cells having data used to create a schedule. A user may be required to change the finish date for a task in grid cell 404 (t3 finish date), for example, t3, for a variety of reasons. For example, the finish date for task 3 may be changed to Aug. 27, 2004 by the user, changing the duration of task 3 to 5 days because the allotted 6 day duration 406 would cause the finish date 404 for task 3 to fall on a Saturday. To indicate to the user that a change has occurred in t3 finish date 404 and t3 duration 406, the computing device 200 may modify the cell appearance of one or more changed grid cells by, for example, highlighting the grid cells, t3 finish date 404 and t3 duration 406. Accordingly, upon cursory inspection of the document, the user is aware that data in finish date 404 and duration 406 has changed. In addition, because task t4 is dependent upon the t3 finish date 404 of task t3, which has changed, both t4 start date 408 and t4 finish date 410 for task t4 will change accordingly. Thus, in order indicate to the user that a change has occurred in the t4 start date 408 and the t4 finish date 410, the computing device 200 may modify the cell appearance of one or more changed grid cells by, for example, highlighting the t4 start date 408 and the t4 finish date 410.

The user interface 400 may allow the user to control whether the computing device 200 changes the cell appearance of grid cells having data that has changed using a toggle switch 412 or the like in a toolbar, by navigating through a series of menu options 414, or through a registry file (not shown). In addition, the user may specify grid cells whose cell appearance should not be altered even though data has changed within the grid cells. Using the user interface 400, the user may also set change display levels, i.e., how many levels of indirect change from a direct change may be modified by the computing device 200. For example, if the change display level is set to 4, for grid 401, any interrelated data associated with task 4 through task 7 would receive grid cell modification when the t3 finish date 404 of task 3 changes although the change to task 3 may affect additional tasks.

If upon review, data that is changed is not acceptable to the user, the user may undo the change to restore the grid 401 to a previous state using the user interface 400. For example, if the previous state showed t3 finish date 404 and t4 start date 408 having a modified appearance, the computing device 200 may display the t3 finish date 404 and the t4 start date 408 at a state earlier than the undo operation. The computing device 200 may permit the user to perform multiple undo operations.

Consistent with embodiments of the present invention, interrelated changes in a grid are displayed to a user. Accordingly, the user will be notified that changes to data within a document have occurred by modifying the appearance of the data or the appearance of a location housing the data. While embodiments of the present invention have been illustrated using a grid, other documents, for example, charts, diagrams, timelines or the like may also be used.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for displaying interrelated changes in a scheduling document, the method comprising:
    monitoring a scheduling document, wherein the scheduling document is used to schedule activities;
    determining if a first scheduling event residing in a first grid cell has changed, the first scheduling event comprising a task, the task comprising scheduling data;
    if a change to the first grid cell occurs, changing viewing characteristics of the first grid cell to a highlighted state and determining if the change to the first scheduling event changes a second scheduling event residing in a second grid cell, wherein the second scheduling event comprises a task which is dependent on the scheduling data for the task in the first scheduling event;
    if the change to the scheduling data for the task in the first scheduling event changes the scheduling data for the task in the second scheduling event residing in a second grid cell, changing viewing characteristics of the second grid cell to a highlighted state; and
    displaying the scheduling document, wherein the displayed scheduling document displays the first grid cell and the second grid cell in the highlighted state.

2. The method of claim 1, wherein monitoring the scheduling document is user controlled.

3. The method of claim 2 further comprising disabling monitoring the scheduling document using a toggle button associated with software used to create the scheduling document.

4. The method of claim 2 further comprising monitoring the scheduling document using a menu option associated with software used to create the scheduling document.

5. The method of claim 1, wherein the scheduling document uses a grid.

6. A system for displaying interrelated changes in a document, the system comprising:
    a memory storage;
    a processing unit coupled to the memory storage, wherein the
    processing unit is operative to:
    monitor a document having a grid;

determine if a first grid cell has changed, the first grid cell comprising a first scheduling event, the first scheduling event comprising a task, the task comprising scheduling data;

if a change to the first grid cell occurs, change viewing characteristics of the first grid cell to a change state and determine if the change to the first grid cell changes a second grid cell, the second grid cell comprising a second scheduling event, the second scheduling event comprising a task which is dependent on the scheduling data for the task in the first scheduling event;

if the change to the scheduling data for the task in the first scheduling event in the first grid cell changes the scheduling data for the task in the scheduling event in the second grid cell, change viewing characteristics of the second grid cell to the change state; and display the document, wherein the displayed document displays the first grid cell and the second grid cell in the change state; and a display device for displaying the document.

7. The system of claim 6, wherein the processing unit is associated with a server.

8. The system of claim 6, wherein the processing is associated with a client-side device.

9. A computer-readable storage medium which stores a set of instructions which when executed performs a method for displaying interrelated changes in a grid, the method executed by the set of instructions comprising:

monitoring a grid;

determining if a first grid cell has changed;

if a change to the first grid cell occurs, changing viewing characteristics of the first grid cell to a change state and determining if the change to the first grid cell changes a second grid cell;

if the change to the first grid cell changes a second grid cell, changing viewing characteristics of the second grid cell to the change state;

displaying the grid, wherein the displayed grid displays the first grid cell and the second grid cell in the change state;

determining if a third grid cell has changed;

if a change to the third grid cell occurs, changing viewing characteristics of the third grid cell to the change state and determining if the change to the third grid cell changes any one of the following: the first grid cell, the second grid cell and a fourth grid cell;

if the change to the third grid cell changes any one of the following: the first grid cell, the second grid cell and a fourth grid cell, changing viewing characteristics of any one of the following: the first grid cell, the second grid cell and a fourth grid cell to the change state, wherein if the change to the third grid cell does not change any one of the following: the first grid cell and the second grid cell, changing any one of the following: the first grid cell and the second grid cell to a normal state, wherein an undo changing the third grid cell and any one of the following: the first grid cell, the second grid cell and a fourth grid cell to the change state can be performed, wherein the first grid cell, the second grid cell, the third grid cell and the fourth grid cell are displayed having a state previous to the undo; and displaying the grid.

10. The computer-readable storage medium of claim 9, wherein the undo can be performed on multiple levels of grid cells in the change state.

11. The computer-readable storage medium of claim 9 wherein the change state overrides formatting associated with at least the first grid cell.

12. The computer-readable storage medium of claim 9, wherein the grid has a plurality of grid cells having a hierarchical structure.

13. The computer-readable storage medium of claim 12, wherein a display level amount can be set for displaying grid cells having the change state and residing within designated part of the hierarchical structure.

14. The computer-readable storage medium of claim 9 further comprising disabling monitoring the grid using a menu option.

15. The computer-readable storage medium of claim 9 further comprising disabling monitoring the grid using a toggle button.

16. The computer-readable storage medium of claim 9, wherein the change state highlights a changed grid cell.

17. The computer-readable storage medium of claim 9, wherein the grid is used in scheduling activities.

* * * * *